United States Patent
Lütke et al.

(10) Patent No.: US 6,640,628 B2
(45) Date of Patent: Nov. 4, 2003

(54) LEVEL-MEASURING DEVICE

(75) Inventors: Wolfram Lütke, Rosenheim (DE); Bernhard Michalski, Maulburg (DE)

(73) Assignee: Endress + Hauser GmbH + Co. KG, Maulburg (DE)

(*) Notice: Subject to any disclaimer, the term of this patent is extended or adjusted under 35 U.S.C. 154(b) by 0 days.

(21) Appl. No.: 10/067,300

(22) Filed: Feb. 7, 2002

(65) Prior Publication Data

US 2002/0095987 A1 Jul. 25, 2002

Related U.S. Application Data

(60) Provisional application No. 60/275,712, filed on Mar. 15, 2001.

(30) Foreign Application Priority Data

Jan. 19, 2001 (DE) .......................... 101 02 571

(51) Int. Cl.[7] .............................................. G01F 23/00
(52) U.S. Cl. .................. 73/290; 340/624; 342/124; 367/189; 367/908
(58) Field of Search ...................... 73/290 V; 342/124; 324/644; 340/621; 367/189, 908

(56) References Cited

U.S. PATENT DOCUMENTS

| | | | |
|---|---|---|---|
| 3,935,970 A | | 2/1976 | Spaw |
| 4,121,094 A | * | 10/1978 | DiVito et al. ................ 377/24 |
| 5,070,730 A | * | 12/1991 | Edvardsson ................ 73/290 V |
| 5,233,352 A | * | 8/1993 | Cournane ..................... 342/124 |
| 5,279,156 A | | 1/1994 | van der Pol |
| 5,438,867 A | * | 8/1995 | van der Pol .............. 73/290 V |
| 5,440,310 A | * | 8/1995 | Schreiner ..................... 342/124 |
| 5,614,831 A | * | 3/1997 | Edvardsson ................ 324/642 |
| 5,659,321 A | * | 8/1997 | Burger et al. ............... 342/124 |
| 5,847,567 A | * | 12/1998 | Kielb et al. ................. 324/642 |
| 5,877,663 A | * | 3/1999 | Palan et al. ................. 333/252 |
| 6,107,957 A | * | 8/2000 | Cramer et al. .............. 342/124 |
| 6,295,874 B1 | * | 10/2001 | Strutt et al. ..................... 73/597 |
| 6,415,660 B1 | * | 7/2002 | Sinz et al. ................. 73/290 R |

FOREIGN PATENT DOCUMENTS

| DE | 4331353 A1 | 3/1995 |
|---|---|---|
| EP | 1039572 A1 | 7/2000 |

* cited by examiner

Primary Examiner—Hezron Williams
Assistant Examiner—Katina Wilson
(74) Attorney, Agent, or Firm—Jones, Tullar & Cooper, P.C.

(57) ABSTRACT

This invention relates to a level-measuring device in which a signal generating device, a sampling device and a transmitting and/or receiving device are optimally connected to one another for various applications and signal shapes. The signal generating device generates both a radio-frequency transmit signal and a sampling control signal for sampling the radio-frequency signal. The sampling device, the signal generating device and the transmitting and/or receiving device being connected by a coupling device which comprises one of: a transformer; at least one line node; a $\lambda/4$ coupler and a circulator.

23 Claims, 12 Drawing Sheets

LEVEL-MEASURING DEVICE

CROSS-REFERENCE TO RELATED APPLICATION

This application relies for priority on a prior filed provisional application, filed Mar. 15, 2001, and assigned Appln. No. 60/275,712.

FIELD OF THE INVENTION

The invention relates to a level-measuring device for determining the level of a medium in a container.

BACKGROUND OF THE INVENTION

Known level-measuring devices use for this purpose a transit time method, for example a TDR method with guided pulses, or another pulse echo method by means of radiation in the direction of the medium. In this method, a pulse-shaped electromagnetic signal is used which propagates at the velocity of light. The medium surface represents an irregularity for the propagation of this signal and the signal is thus reflected to the transmitter. To be able to determine the transit time of the reflected transmit signal, a time measurement must be performed in the nanosecond range. Since, as a rule, electronic circuits operate too slowly for a direct transit time measurement in this case, the echo signal variation must be transformed into an extended time scale in a suitable manner. For this purpose, a pulse is periodically sent out from which a signal sample is taken by a sampling circuit at a position which progresses from pulse to pulse.

After a measuring cycle, which can consist of several thousand individual periods, has elapsed, a time-transformed signal variation is obtained which represents the total transit path of the signal. From this, the distance between medium surface and level-measuring device can be determined, which is a measure of the level. Industrially used measuring ranges extend from a few 10 cm up into ranges of over 50 m.

Known level-measuring devices of this type comprise a signal generating device for generating both a radio-frequency transmit signal and a sampling control signal for sampling the radio-frequency signal, a transmitting and/or receiving device and a sampling device, controlled by the sampling control signal, for sampling the radio-frequency signal, the signal generating device, the transmitting and/or receiving device and the sampling device being connected by a coupling device. To be able to meet the requirements of the various measuring ranges, signal generator devices and sampling circuits have been varied in previous measuring devices. However, this results in unwanted losses in the connection between signal generating device and transmitting and/or receiving device and between transmitting and/or receiving device and sampling device.

SUMMARY OF THE INVENTION

It is, therefore, an object of the present invention to avoid the above-mentioned disadvantages and, in particular, to create level-measuring devices in which signal generator devices and sampling devices and transmitting and/or receiving devices are optimally connected to one another.

This object is achieved by a first variant of the invention in which the level-measuring device exhibits a signal generating device for generating both a radio-frequency transmit signal and a sampling control signal for sampling the radio-frequency signal, a transmitting and/or receiving device and a sampling device, controlled by the sampling control signal, for sampling the radio-frequency signal, the signal generating device, the transmitting and/or receiving device and the sampling device being connected by a coupling device which comprises a transformer.

This object is also achieved by a second variant of the invention in which the level-measuring device exhibits a signal generating device for generating both a radio-frequency transmit signal and a sampling control signal for sampling the radio-frequency signal, a transmitting and/or receiving device and a sampling device, controlled by the sampling control signal, for sampling the radio-frequency signal, the signal generating device, the transmitting and/or receiving device and the sampling device being connected by a coupling device which comprises at least one line node.

This object is also achieved by a third variant of the invention in which the level-measuring device exhibits a signal generating device for generating both a radio-frequency transmit signal and a sampling control signal for sampling the radio-frequency signal, a transmitting and/or receiving device and a sampling device, controlled by the sampling control signal, for sampling the radio-frequency signal, the signal generating device, the transmitting and/or receiving device and the sampling device being connected by a coupling device which comprises a $\lambda/4$ coupler.

In addition, this object is achieved by a fourth variant of the invention in which the level-measuring device exhibits a signal generating device for generating both a radio-frequency transmit signal and a sampling control signal for sampling the radio-frequency signal, a transmitting and/or receiving device and a sampling device, controlled by the sampling control signal, for sampling the radio-frequency signal, the signal generating device, the transmitting and/or receiving device and the sampling device being connected by a coupling device which comprises a circulator.

Preferred embodiments of the third variant of the level-measuring device according to the invention relate to those with $\lambda/4$ couplers which are Wilkinson couplers, Lange couplers, directional couplers, line couplers or, for example, coaxial couplers.

In other preferred embodiments of the invention, the signal generating device comprises a comparator circuit, a beat oscillator circuit or a regulated delay circuit which are used for delaying the sampling signal with respect to the radio-frequency transmit signal.

Other preferred embodiments of the invention relate to level-measuring devices with sampling devices which comprise a diode ring circuit or at least one diode and one holding capacitor or a mixer circuit.

In yet other preferred embodiments of the invention, the radio-frequency transmit signal is a burst signal.

The invention enables transmitting and receiving characteristics of the level-measuring device to be matched to one another in a simple manner for different signals and/or measuring ranges by optimizing one of its components.

In addition, the invention uses a simple and rugged DC decoupling of the transmitting and/or receiving device from the rest of the measuring device so that the level-measuring device according to the invention is particularly suitable for uses in hazardous areas or applications.

In the text which follows, the invention will be explained and described in greater detail using the example of various preferred embodiments, using and referring to the attached drawings. Components or assemblies of identical construction or identical in their operation are provided with the same reference symbols for the sake of simplicity.

BRIEF DESCRIPTION OF THE DRAWINGS

FIG. 4b shows a diagrammatic representation of a special embodiment of a coupling device of a level-measuring device according to FIG. 4a;

FIG. 7b shows a preferred embodiment of the signal generating device according FIG. 7a;

FIG. 7c shows another preferred embodiment of the signal generating device according to FIG. 7a;

FIG. 7d shows a further preferred embodiment of the signal generating device according to FIG. 7a;

FIG. 8b shows a preferred embodiment of the sampling device according to FIG. 8a;

FIG. 8c shows another preferred embodiment of the sampling device according to FIG. 8a;

FIG. 8d shows a further preferred embodiment of the sampling device according to FIG. 8a;

DESCRIPTION OF THE PREFERRED EMBODIMENTS

Figure 1A:
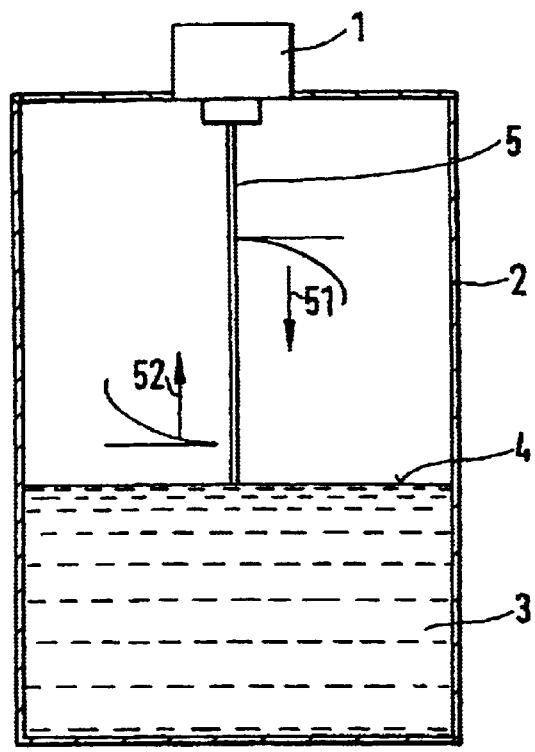
FIGS. 1a, 1b show diagrammatic overall representations of level-measuring devices.

FIG. 1a shows a level-measuring device 1 which is mounted on or at a container 2 and which is used for measuring the level of a medium 3 contained therein. As shown in FIG. 1a, the level-measuring device 1 generates a transmit signal 51 and sends it out in the direction of the medium 3. For this purpose, the transmit signal 51 is conducted to a waveguide 5 immersed in the medium 3 and reflected from a medium surface 4. The reflected signal 52 is conducted to the level-measuring device 1 where an information item on the distance between level-measuring device 1 and medium surface 4 is obtained which is necessary for the level to be determined. FIG. 1a also illustrates a possible signal shape of the transmit signal and reflected signal 51 and 52, respectively.

Figure 1B:
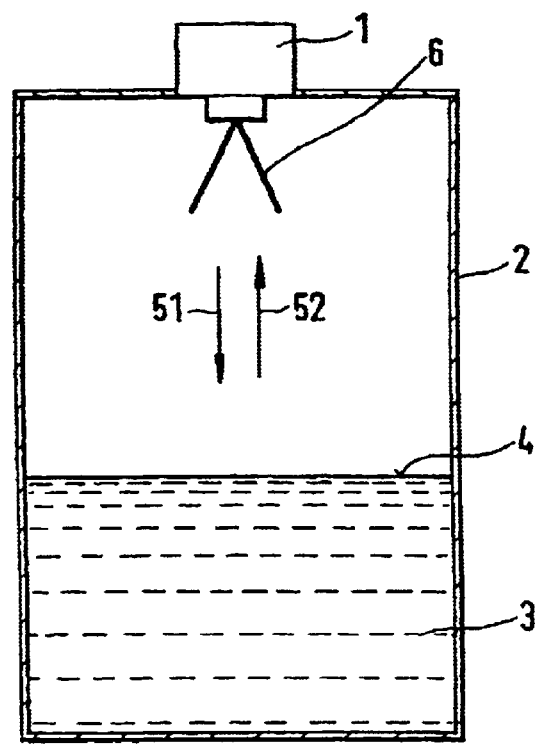

FIG. 1b shows the level-measuring device 1 in which, however, in contrast to FIG. 1a, the transmit signal 51 used for measuring the level is not conducted but sent out in the direction of the medium 3 by means of an antenna 6. The antenna 6 is also used for receiving the signal 52 reflected from the medium surface 4. The waveguide 5 and the antenna 6 in each case represent a transmitting and/or receiving device 20 (see also FIG. 2 in this respect) of the level-measuring device 1. In the text which follows, the term transmitting and/or receiving device 20 is used whenever either a waveguide 5 or an antenna 6 can be used.

Figure 2:
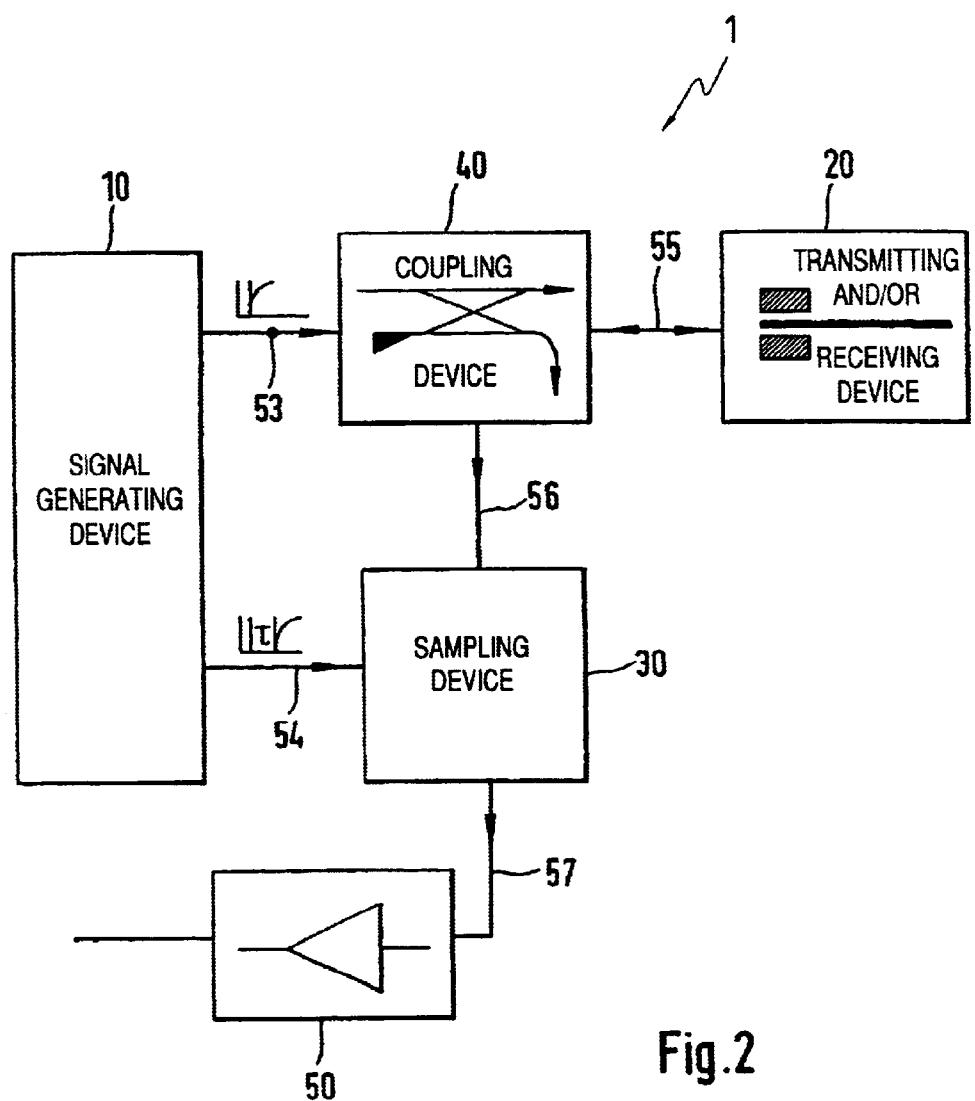
FIG. 2 shows a diagrammatic representation of the configuration of a level-measuring device.

FIG. 2 illustrates a configuration of a level-measuring device 1 in diagrammatic representation which essentially comprises a signal generating device 10, transmitting and/or receiving device 20, a sampling device 30 and a coupling device 40. The coupling device 40 connects the signal generating device 10 to the transmitting and/or receiving device 20 and the latter to the sampling device 30.

A radio-frequency signal 53 generated in the signal generating device 10 is applied as transmit signal 55 via the coupling device 40 to the transmitting and/or receiving device 20 and sent from there to the medium 3 (see FIGS. 1a, b). The reflected signal 52 (see FIGS. 1a, b) is received by the transmitting and/or receiving device 20 and transferred to the sampling device 30 via the coupling device 40.

A sampling control signal 54 generated by the signal generating device 10 controls the sampling of the reflected signal 52 received from the transmitting and/or receiving device 20. An extended-time receive signal 57 obtained at the output of the sampling device 30 is preferably amplified in an amplifier 50 for better processing.

Figure 3:
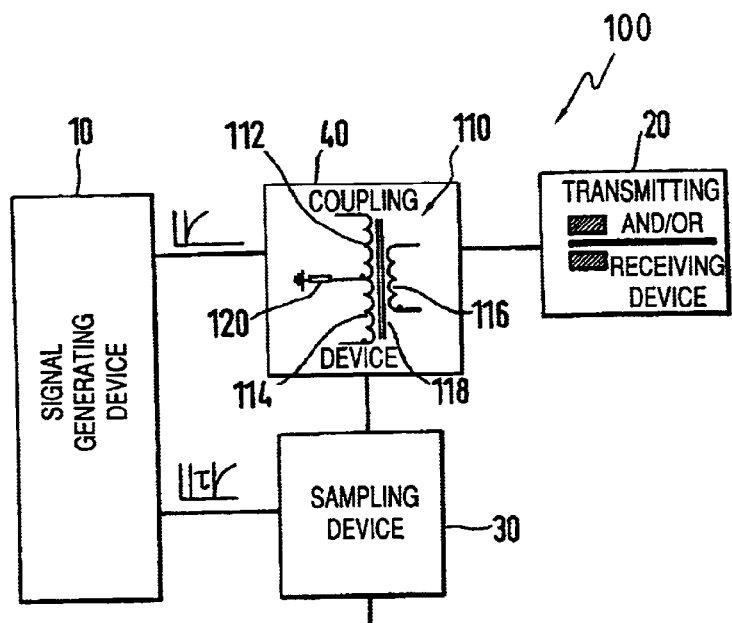
FIG. 3 shows a diagrammatic representation of the configuration of the first variant of the level-measuring device according to the invention.

FIG. 3 shows in a diagrammatic representation a first variant 100 of a level-measuring device 1 according to the invention. In this case, the coupling device 40 comprises according to the invention a transformer 110. The transformer 110 exhibits a transmit-winding 112, a receive winding 114 and a winding for coupling in the transmitting and/or receiving device 116 and is wired in the manner shown in FIG. 3. A DC decoupling 118, achieved by the transformer 110, of the transmitting section from the receiving section of the level-measuring device 1 allows it to be used even in hazardous environments. A terminating resistor 120 is used for matching the coupling device 40 with the transformer 110 to the signal generating device, the transmitting and/or receiving device 20 and the sampling device 30.

FIG. 4 shows a second variant 200 of a level-measuring device 1 according to the invention. In this case, the coupling device 40 comprises according to the invention at least one line node 210. The line node 210 is preferably connected to three coupling resistors 212, 214 and 216 in the manner shown in FIG. 4. The coupling resistors 212, 214 and 216 can also be complex impedances, e.g. capacitors, so that a DC decoupling can be achieved again in this manner, as in the first variant of the invention 100 (see in this context FIG. 3). It is also conceivable to make the coupling resistors 212, 214 and 216 mixed-complex or even tending toward zero. In the latter case, no further wiring would then be necessary apart from the node 210. Such an embodiment is possible if the signal generating device 10, the transmitting and/or receiving device 20 and the sampling device 30 are matched to one another by a suitable choice of source and load impedances.

Figure 4A:
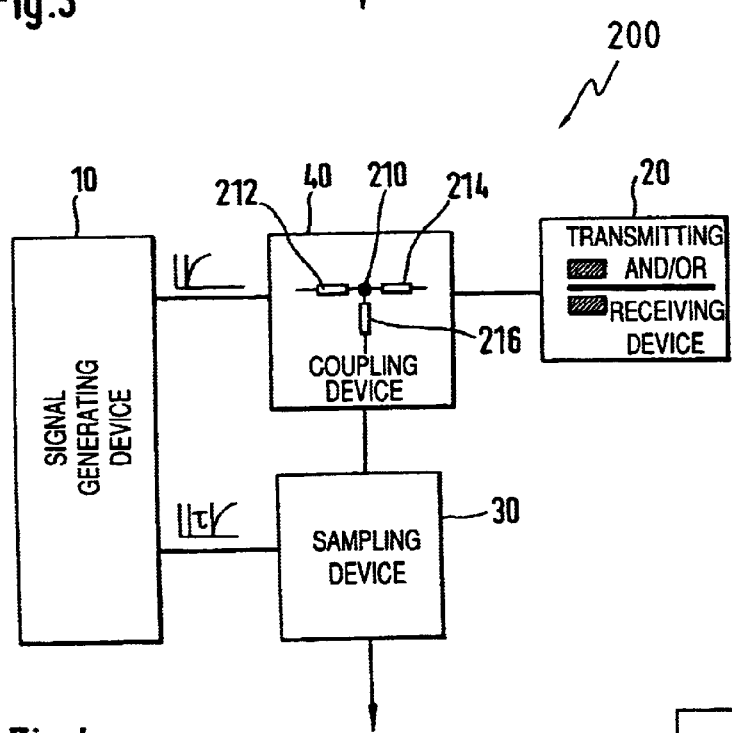
FIG. 4a shows a diagrammatic representation of the configuration of the second variant of the level-measuring device according to the invention.
Figure 4B:
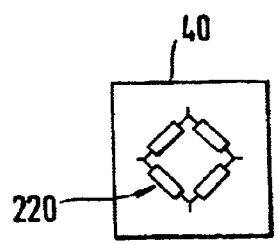

Another and particular embodiment of the coupling device 40 according to the invention and according to FIG. 4a is shown diagrammatically in FIG. 4b. In this case, the coupling resistors 212, 214 and 216 are connected together to form a coupling bridge 220.

Figure 5A:
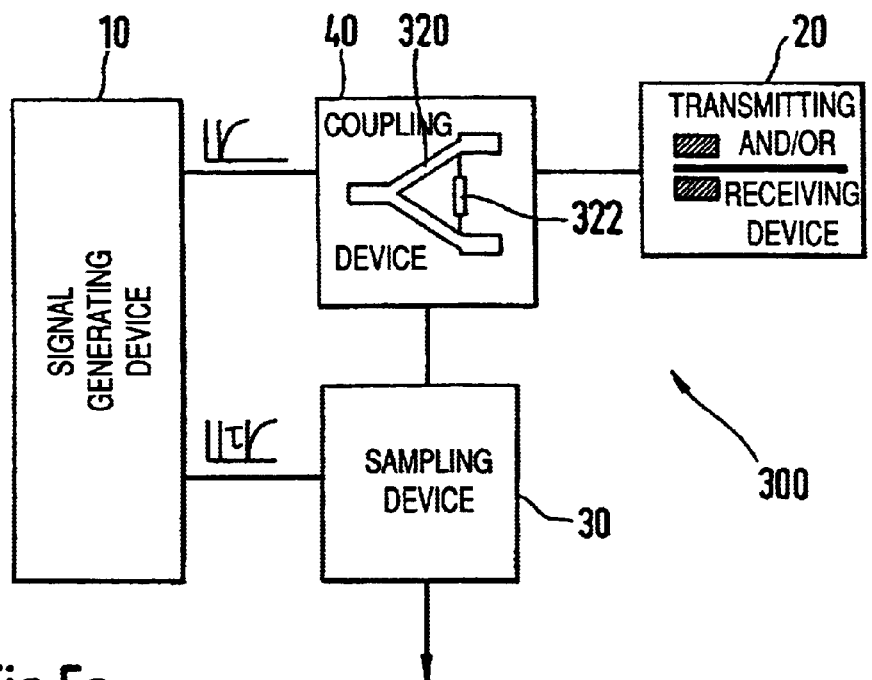
FIGS. 5a, b, c, d, e show a diagrammatic representation of the configuration of preferred embodiments of the third variant of the level-measuring device according to the invention.
Figure 5B:
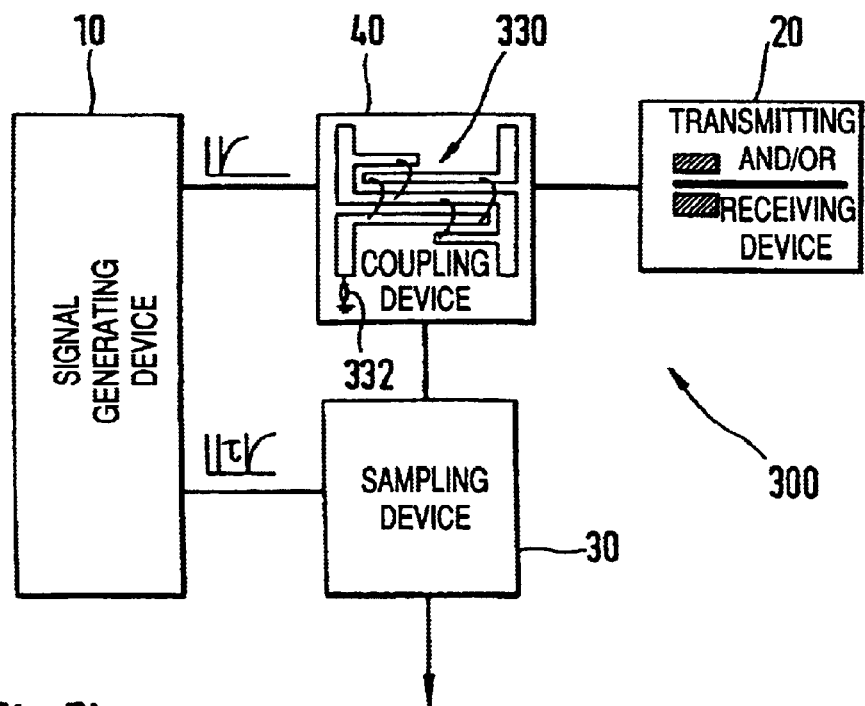
Figure 5C:
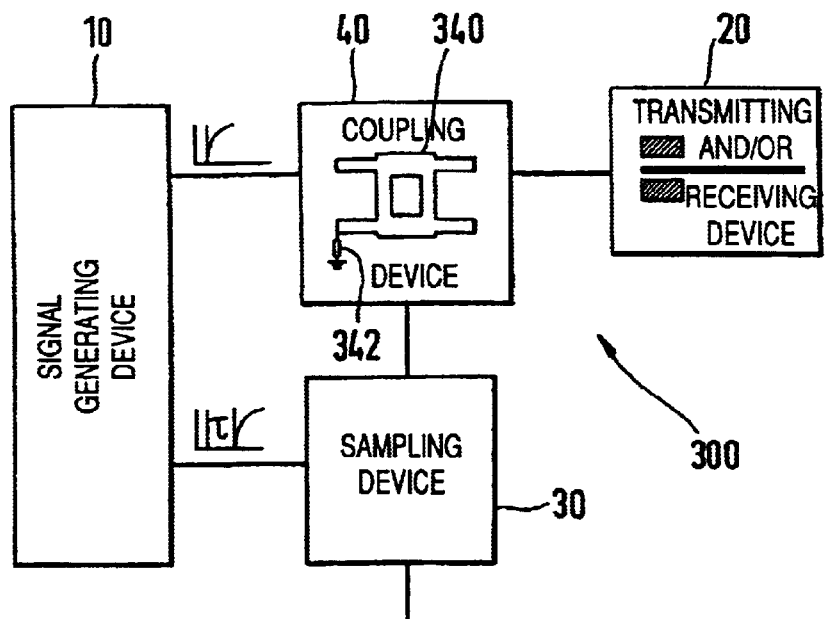
Figure 5D:
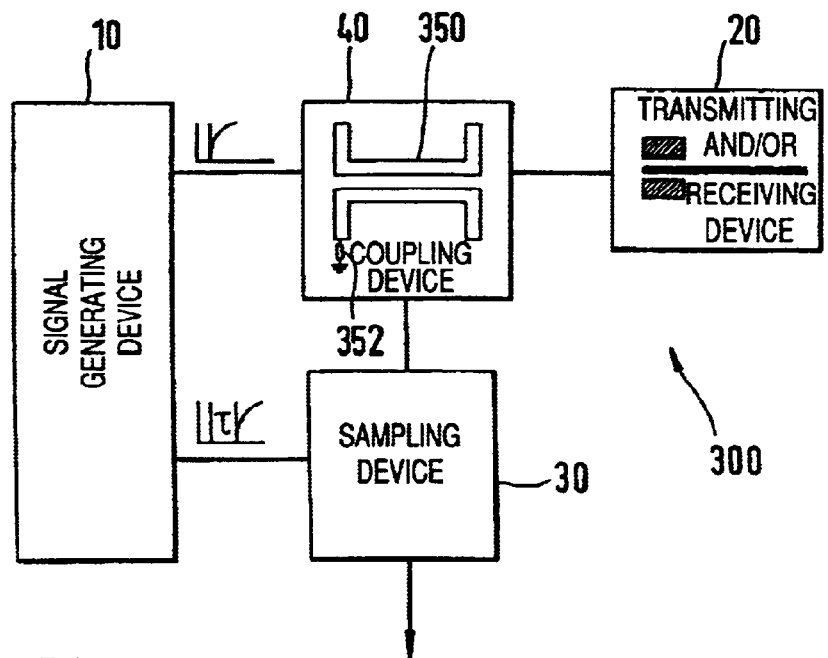

FIGS. 5a to 5e show preferred embodiments of a third variant 300 of a level-measuring device 1 according to the invention, in which the coupling device 40 in each case comprises a λ/4 coupler. The embodiment shown in FIG. 5a is a so-called Wilkinson coupler 320 which is wired in the manner shown there and with a terminating resistor 322. FIG. 5b shows a coupling device 40 which comprises a so-called Lange coupler 330 which is wired in the manner shown there and with a terminating resistor 332. FIG. 5c shows a coupling device 40 which comprises a directional coupler 340 which is wired in the manner shown there and with a terminating resistor 342. FIG. 5d shows a further coupling device 40 which comprises a line coupler 350 which is wired in the manner shown there and with a terminating resistor 352.

The λ/4 couplers shown in FIGS. 5a to d can be implemented in a simple manner, and thus inexpensively, as passive structures on conventional circuit boards. Such coupling devices 40 with λ/4 couplers are particularly suitable for burst signals and high frequencies, as are used, for example, for highly accurate measurement at short distances.

Figure 5E:
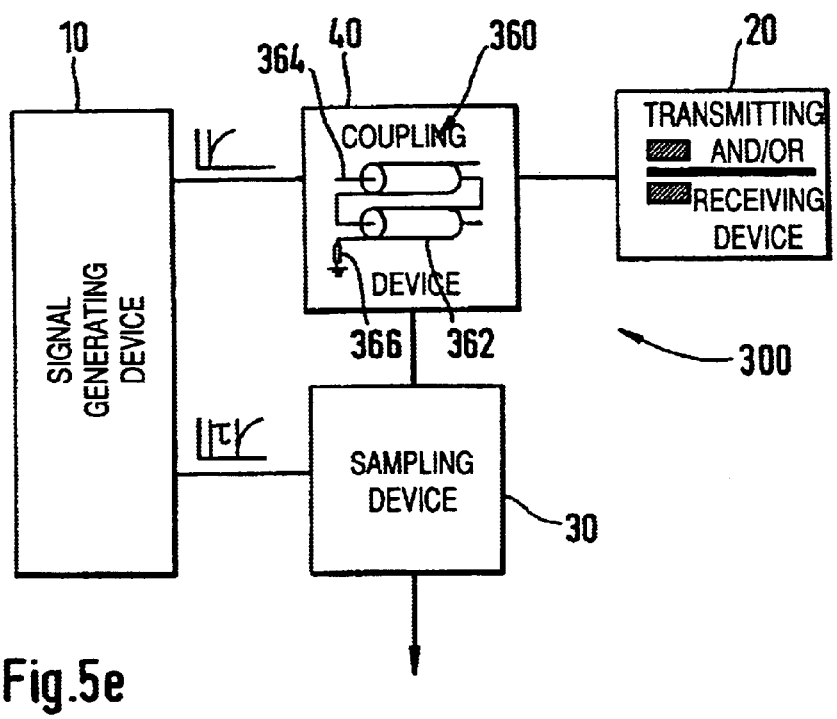

FIG. 5e shows yet another λ/4 coupler which comprises a coaxial line coupler 360 with inner conductor 364 and shield conductor 362 and which is wired in the manner shown there and with a terminating resistor 366. Because of its structure, such a coupling device 40 with a coaxial line coupler 360 is particularly suitable for burst signals of lower frequencies, for example less than 1 GHz, and thus for applications for determining large distances.

Figure 6:
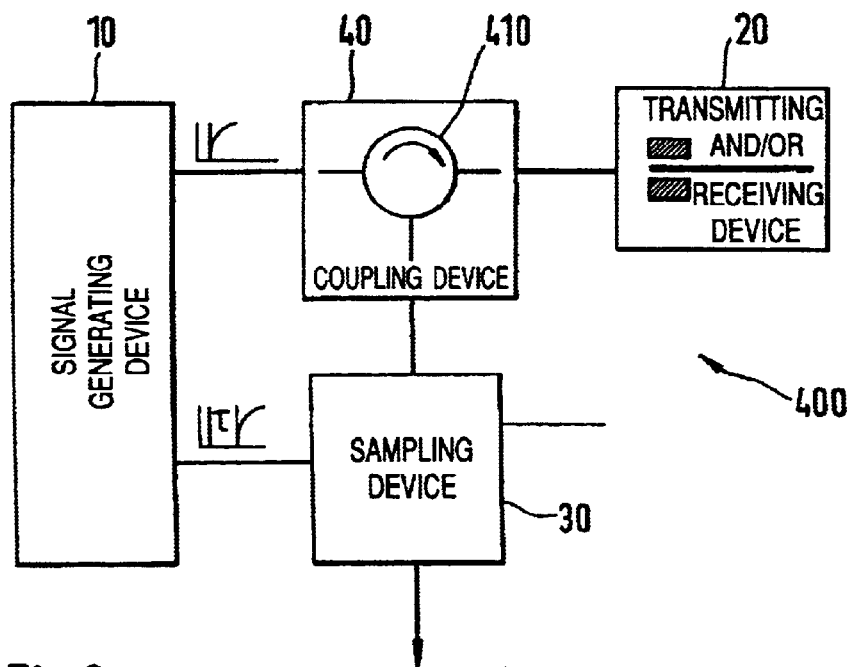
FIG. 6 shows a diagrammatic representation of the configuration of the fourth variant of the level-measuring device according to the invention.

FIG. 6 shows a fourth variant 400 of a level-measuring device 1 according to the invention. In this case, the coupling device 40 comprises a circulator 410 according to the invention. Similarly to the coupling devices shown in FIGS. 5a to 5b, such a coupling device 40 is also based on resonant λ/4 structures and can be designed in a similar narrow-band manner.

Figure 7A:
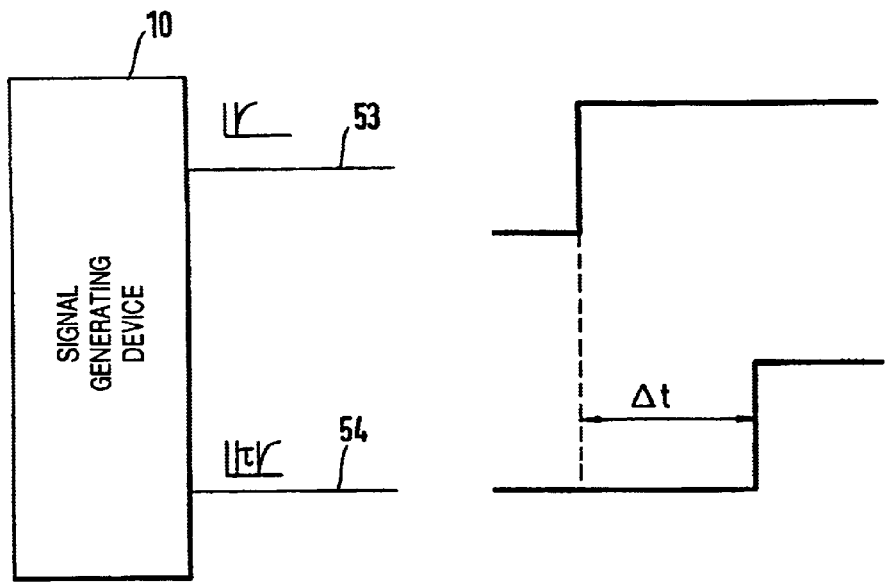
FIG. 7a shows a diagrammatic representation of a signal generating device according to the invention and of the signals obtained by this device.
Figure 7B:
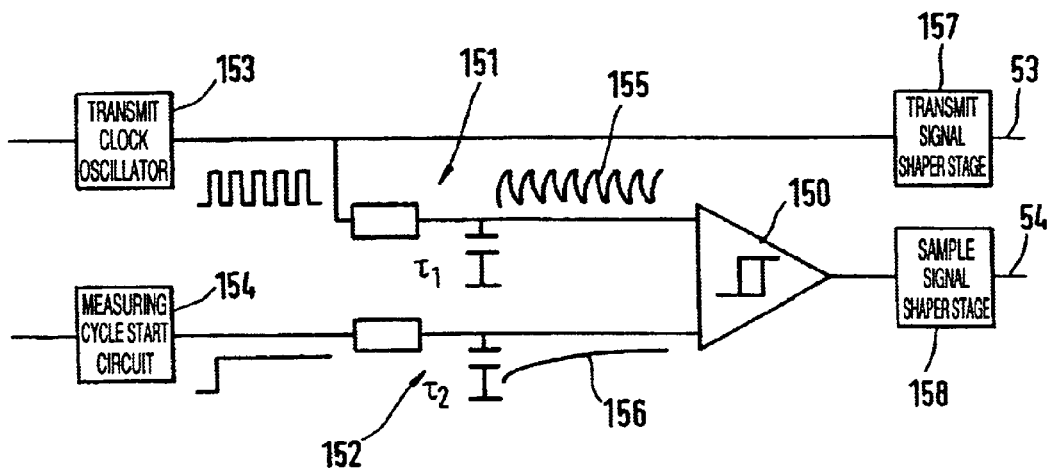
Figure 7C:
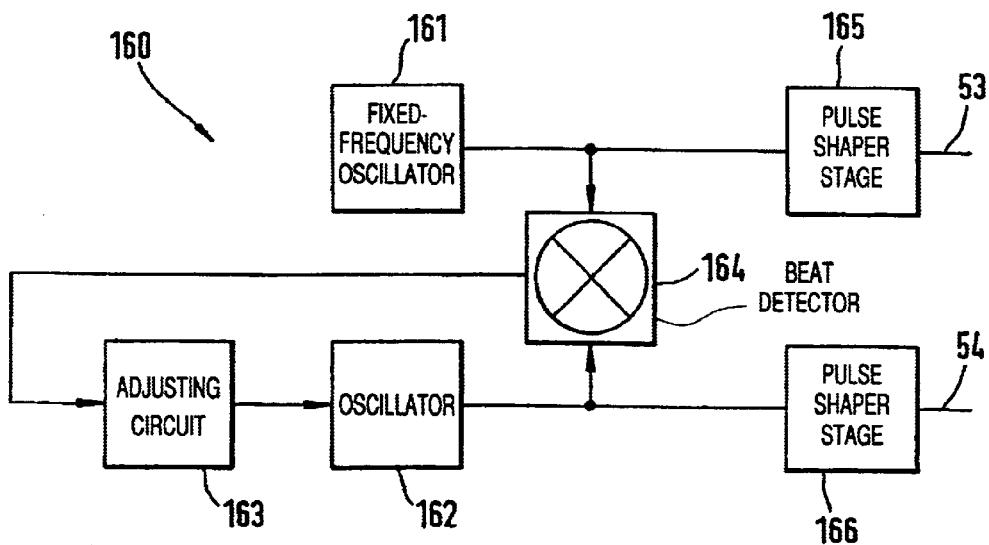
Figure 7D:
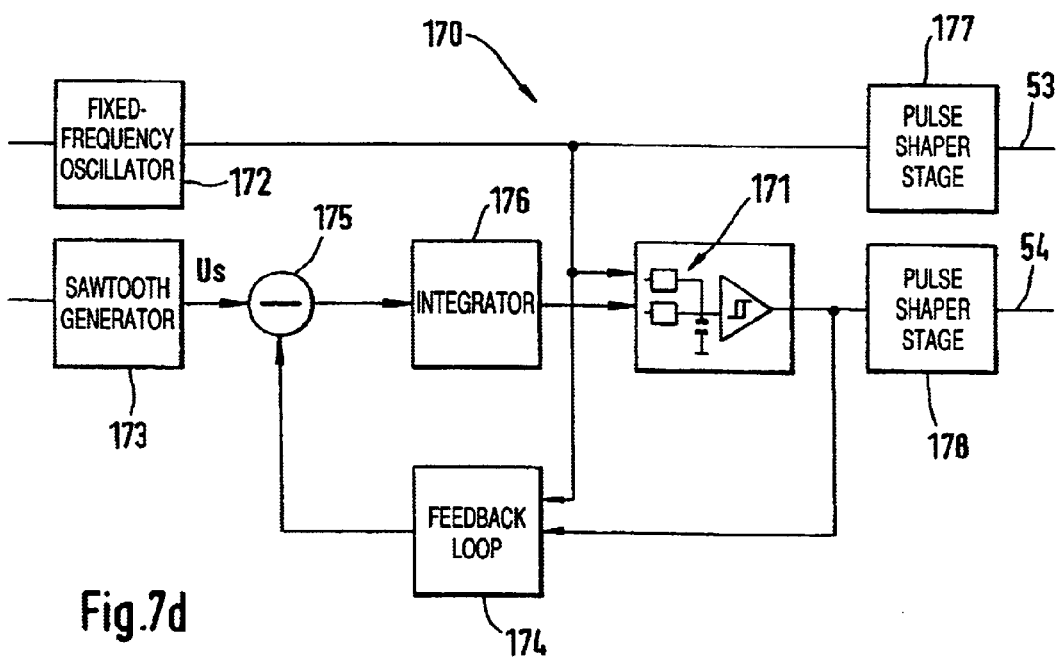

FIGS. 7b to 7d show various embodiments of signal generating devices 10, as are used with each of the variants of a level-measuring device 1 according to the invention previously shown in FIGS. 3 to 6.

FIG. 7a is used for explaining the operation of the signal generating device 10. As already mentioned above, the signal generating device 10 generates the periodic radio-frequency transmit signal 53 and the sampling control signal 54 which is synchronous with the former. The delay time of the sampling control signal 54 can be controlled in a defined manner and the signal is supplied to the sampling device 30. A time difference Δt between the radio-frequency transmit signal 53 and sampling control signal 54 is a direct measure of the distance point measured at the respective time between level-measuring device 1 and medium surface 4 (see FIG. 1) and is linked together by the velocity of light. Various signal generating devices 10 are shown which differ in linearity, drift and accuracy and thus have a different influence on this distance measuring result.

The signal generating device 10 shown in FIG. 7b comprises a comparator 150 and a first RC combination 151 and a second RC combination. The RC sections 151, 152, the time constants of which are different, are connected to the fast voltage comparator 150. The faster RC section 151 is periodically charged and discharged by a rectangular signal generated in a transmit clock oscillator 153. The slower RC section 152 is charged and discharged once with each measuring cycle, the measuring cycle being determined by a signal supplied by a measuring cycle start circuit 154.

Depending on the resolution and distance for the level measurement to be measured, a measuring cycle consists of a few 10 000 transmit clock. Due to the fact that the charging voltage across RC section 152 rises very slowly, each new transmit clock results in a different switching threshold at the comparator 150 for the charging voltage across RC section 151. Thus, the sampling clock is delayed by a constant time increment with respect to the transmit clock with each transmit cycle. Although the RC sections 151, 152 are charged and discharged in accordance with an e function, the resultant time increments follow a linear function so that the distance sampling increments can also be shown linearly. The time-base extension factor is obtained directly from the ratio between the time constants of the two RC sections 151, 152.

To obtain the radio-frequency transmit signal 53, the output signal of the oscillator 153 is subjected to reshaping in a transmit signal shaper stage 157. In this transmit signal shaper stage 157, radio-frequency transmit signals 53 are shaped as burst or pulse signals depending on the desired application. Similarly, the output signal of the comparator 150 is subject to pulse shaping in the sampling signal shaper stage 158 to generate the sampling signal 54 in accordance with the signal shape of the radio-frequency transmit signal 53, burst or pulse.

The signal generating device 10 with the comparator 150, as shown in FIG. 7b, is simple to construct, is sufficiently accurate for simple applications and very inexpensive.

FIG. 7c shows a further embodiment of the signal generating device 10 which comprises a beat oscillator circuit 160 in this case.

A fixed frequency oscillator 161 provides the transmit clock, similarly to the transmit clock oscillator 153 (see FIG. 7b). An adjustable oscillator 162, the operating frequency of which differs only slightly from that of the fixed-frequency oscillator 161, generates a sampling control signal. Due to the small frequency difference, the oscillator 162 lags more by a small time increment Δt with each frequency period of the fixed-frequency oscillator 161. To generate the time increment in a defined manner, the frequency of the oscillator 162 is regulated via the beat frequency produced by mixing at a beat detector 164. For this purpose, an adjusting circuit 163 is used which generates a control signal to the adjustable oscillator 162 from the output signal of the beat detector 164.

The time-base extension factor is obtained from the frequency of the fixed-frequency oscillator 161 and the beat frequency of the beat detector 164. If the circuit shown in FIG. 7c is constructed with quarz oscillators, it is distinguished by special stability and accuracy. Similarly to the embodiment shown in FIG. 7b, the desired burst or pulse signal shape of the sampling signal 54 or of the radio-frequency transmit signal 53, respectively, can be obtained by pulse shaper stages 166 and 165, respectively.

FIG. 7d shows another embodiment of the signal generating device 10 which contains a regulated delay circuit 170 in this case. An RC section 171 consisting of two resistors and one capacitor is driven on the one hand by a fixed-frequency oscillator 172 which predetermines the transmit clock and on the other hand indirectly by a sawtooth generator 173, the sawtooth voltage Us of which is a measure of the distance point to be measured.

Since the voltage-time behavior of the RC section 171 is an e function, linearization is achieved via a feedback loop 174 which feeds in a correction signal via the subtracter 175. In combination with the subsequent integrator 176, there is a closed control loop so that the time increments are directly proportional to the sawtooth voltage steps. Similarly to FIGS. 7c and 7e, the desired burst or pulse signal shape of the sampling signal 54, or of the radio-frequency transmit signal 53, respectively, can be obtained by pulse shaper stages 178 and 177, respectively. The good accuracy with comparatively favorable costs was advantageous in this embodiment of the signal generating device 170. In addition, direct driving is possible with the aid of a D/A converter.

FIGS. 8a to 8d show various embodiments of sampling devices, as can be used with each of the variants of a level-measuring device 1 according to the invention, previously shown in FIGS. 3 to 6.

As shown in FIG. 2, the sampling device 30 is used for converting the reflected radio-frequency receive signal 56 supplied by the coupler device 40 into an extended-time receive signal 57. This sampling process is performed once in each transmit clock period. The time of sampling is predetermined by the sampling control signal 54 of the signal generating device 10.

Figure 8A:
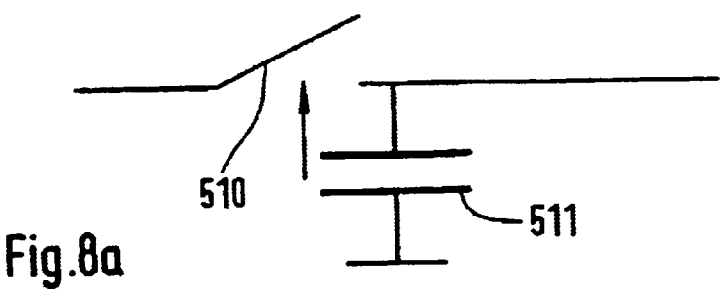
FIG. 8a shows a diagrammatic representation of a sampling device according to the invention.
Figure 8B:
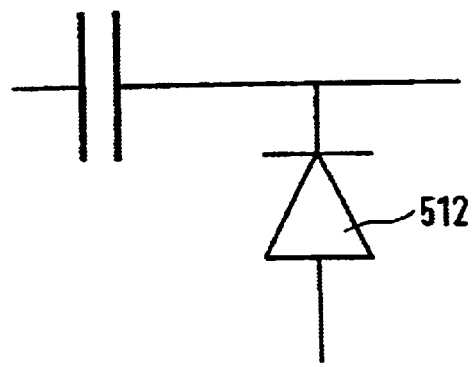

The diagrammatic representation of a sampling device in FIG. 8a shows a switching element 510 and a charging capacitor 511 at the output of the switching element. This sampling device is also generally known by the term sample & hold circuit. To sample fast signals, the switching element 510 is replaced by a fast switching diode 512 as shown in FIG. 8b. The arrangement in FIG. 8b serves as an example, it is also possible to interchange capacitor and switching diode.

Figure 8C:
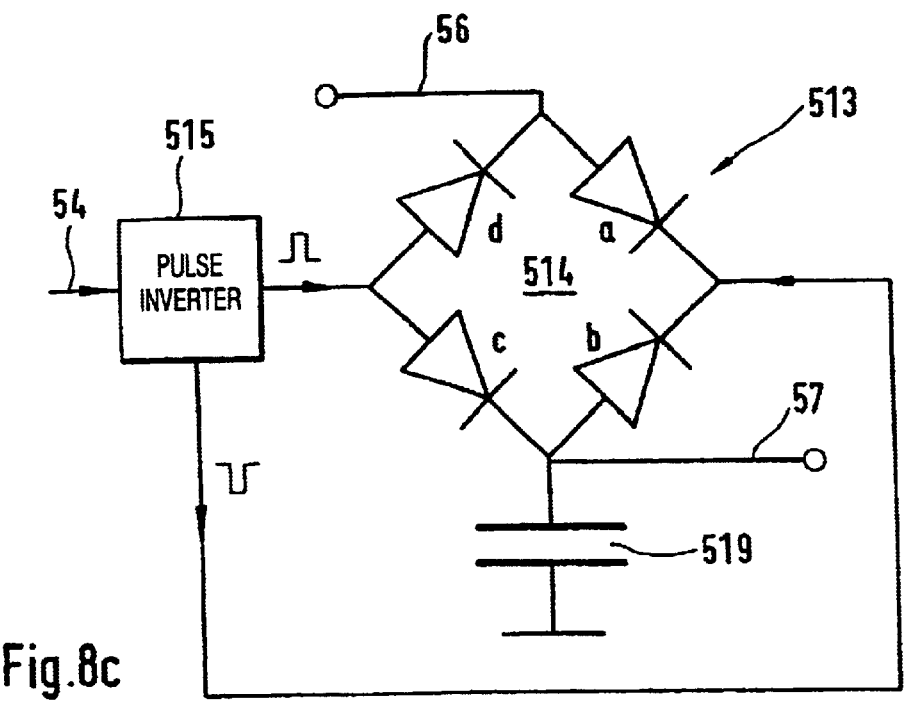

In FIG. 8c, a diode bridge 513, which contains four fast switching diodes 514a to 514d in the configuration shown, is shown instead of a switching element. In contrast to the illustrative embodiment in FIG. 8b, this diode bridge is driven by complementary signals which are generated by the pulse inverter 515. The input control signal of the pulse inverter is supplied by the sampling control signal 54 of the signal generating device 10. The reflected radio-frequency signal 56, see also FIG. 2, of the coupling device 40 is connected to one input of the diode bridge 513. The extended-time receive signal 57 of this sampling device is available across the charging capacitor 519.

Figure 8D:
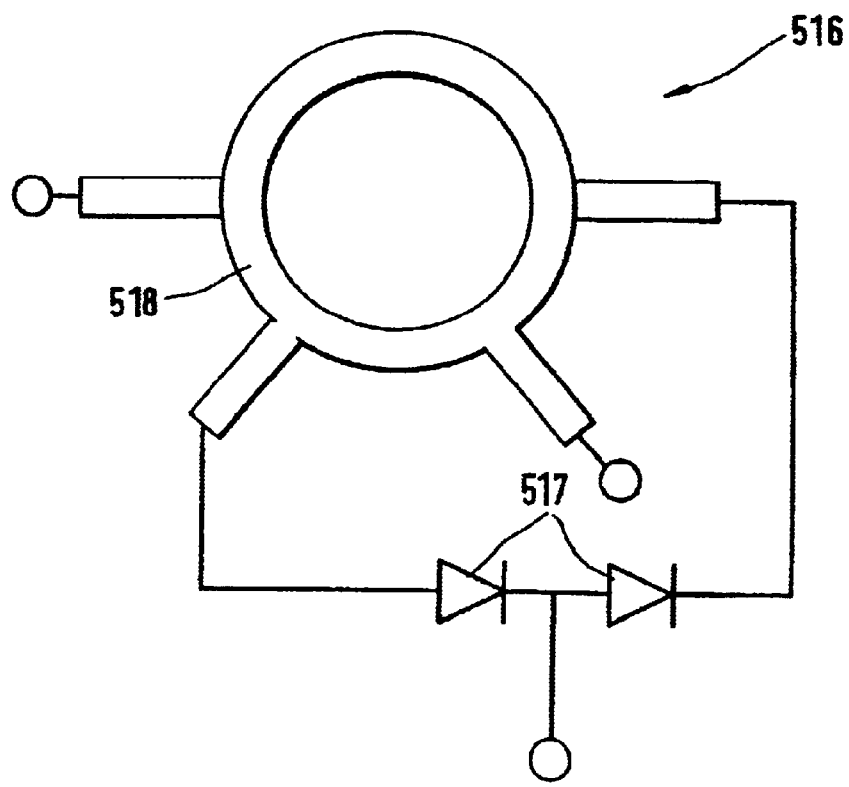

The sampling devices hitherto described in FIGS. 8a to 8c are particularly suitable for sampling pulse signals. For sampling burst signals, in contrast, an arrangement according to FIG. 8d is advantageous. In this arrangement, a symmetric mixer circuit 516 is used which consists of a ring hybrid 518 and two mixer diodes 517. The operation of this mixer circuit is described in the text which follows by means of a diagrammatic representation of a complete level-measuring device in FIG. 9.

Figure 9:
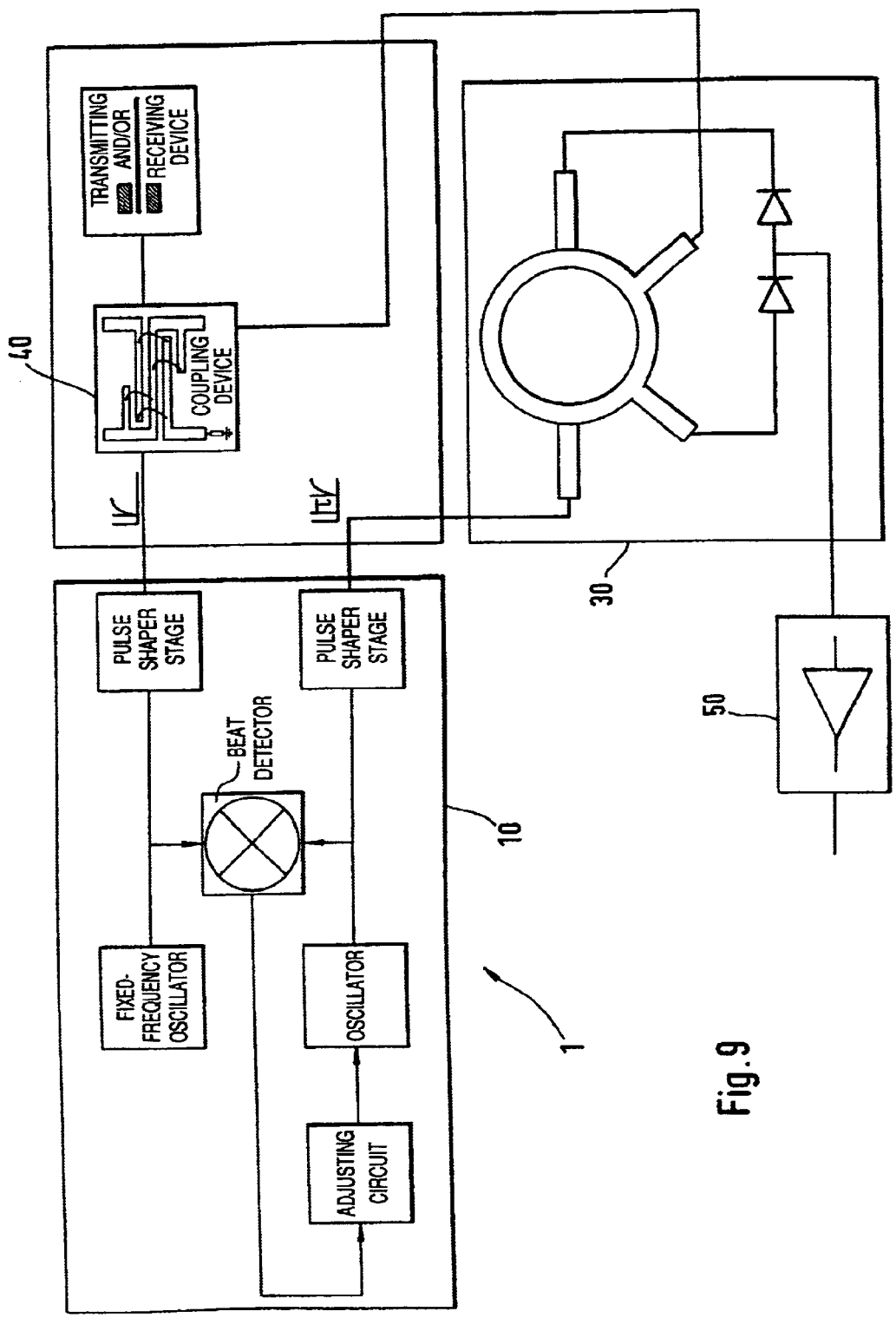
FIG. 9 shows a diagrammatic representation of a preferred embodiment of the invention which is particularly suitable for burst signals.

FIG. 9 shows a signal generating device 10 of a level-measuring device 1 according to the invention comprising a beat generator circuit 160 according to FIG. 7c which is connected to a coupling device 40 constructed as Lange coupler 330 (see FIG. 5b) and to a sampling device 30 according to FIG. 8d. In this example, the pulse shaper stages at the output of the beat generator circuit 160 generate burst signals which require a mixer circuit for extending the time base of the reflected receive signal 56. As such, the arrangement according to FIG. 8d has been found to be advantageous because of its relatively simple structure in conjunction with a possible planar embodiment.

Figure 10:
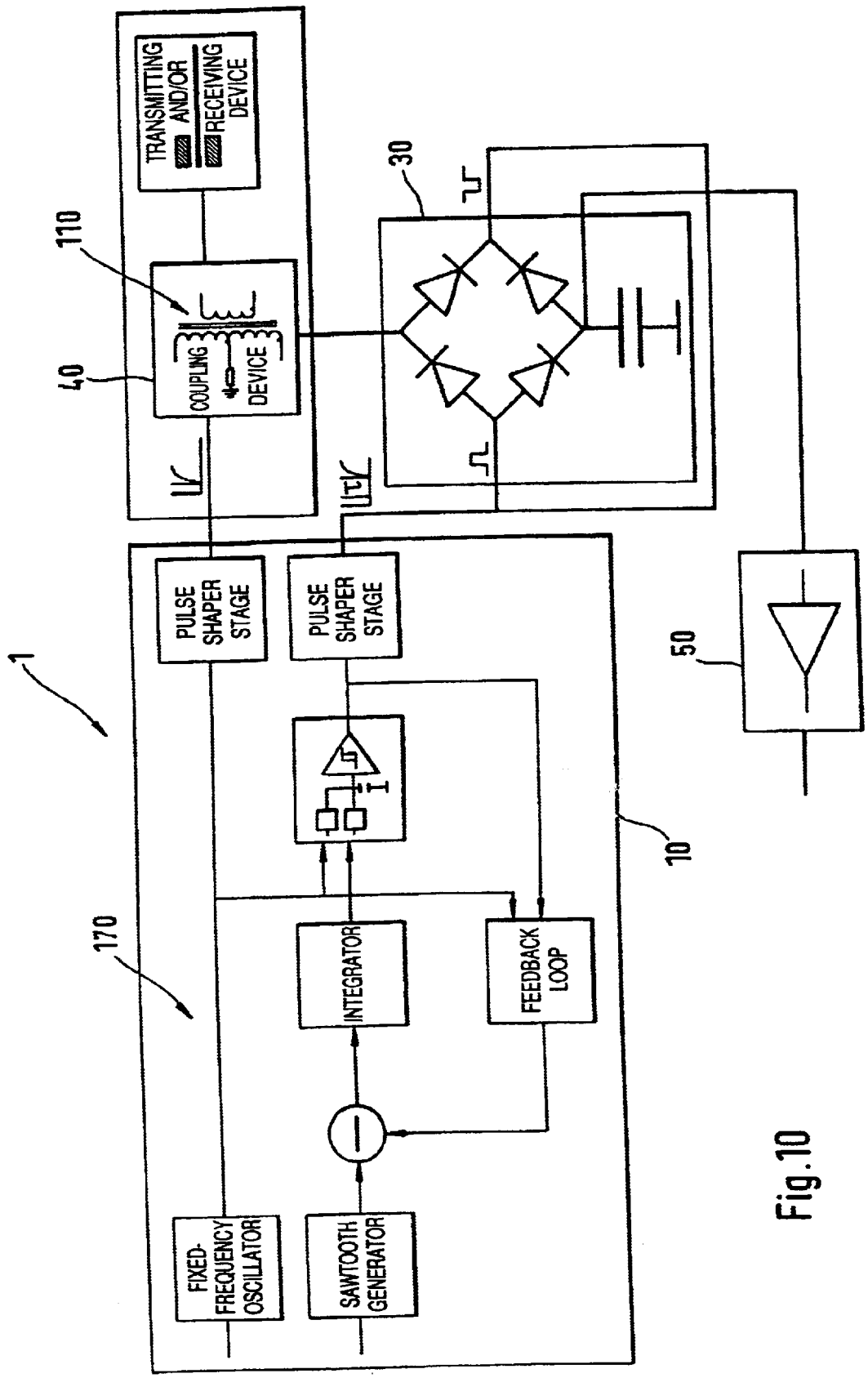
FIG. 10 shows a diagrammatic representation of a preferred embodiment of the invention which is particularly suitable for pulse signals.

FIG. 10 shows a level-measuring device 1 according to the invention which is particularly suitable for pulse signals. In this case, the signal generating device 10 comprises a regulated delay circuit 170 according to FIG. 7d which is connected to a coupling device 40, which is constructed as transformer 110 (see FIG. 3) and to a sampling device 30 according to FIG. 8c. The pulse shaper stages at the output of the signal generating device 10 generate pulse signals in this example. To extend the time base of the reflected receive signal 56, a sampling device 30 with a diode ring 513 from FIG. 8c is provided. The entire arrangement provides for an inexpensive and similarly accurate level-measuring device.

What is claimed is:

1. A level-measuring device for determining the level of a medium in a container, comprising: a signal generating device for generating both a radio-frequency transmit signal and a sampling control signal for sampling the radio-frequency signal; a transmitting and/or receiving device; a sampling device, controlled by said sampling control signal, for sampling the radio-frequency signal; and a coupling device for electrically coupling said signal generating device, said transmitting and/or receiving device and said sampling device, wherein said coupling device comprises a transformer.

2. The level-measuring device as claimed in claim 1, in which said signal generating device comprises a comparator circuit which is used for delaying said sampling signal with respect to said radio-frequency transmit signal.

3. The level-measuring device as claimed in claim 2, in which said sampling device comprises a diode ring circuit and a holding capacitor.

4. The level-measuring device as claimed in claim 2, in which said sampling device comprises at least one diode and one holding capacitor.

5. The level-measuring device as claimed in claim 2, in which said sampling device comprises a mixer circuit.

6. The level-measuring device as claimed in claim 1, in which said signal generating device comprises a beat oscillator circuit which is used for delaying said sampling signal with respect to said radio-frequency transmit signal.

7. The level-measuring device as claimed in claim 1, in which said signal generating device comprises a regulated delay circuit which is used for delaying said sampling signal with respect to said radio-frequency transmit signal.

8. The level-measuring device as claimed in claim 1, in which said radio-frequency transmit signal is a burst signal.

9. The level-measuring device as claimed in claim 1, in which said sampling device comprises a diode ring circuit and a holding capacitor.

10. The level-measuring device as claimed in claim 9, in which said signal generating device comprises a comparator circuit which is used for delaying said sampling signal with respect to said radio-frequency transmit signal.

11. The level-measuring device as claimed in claim 9, in which said signal generating device comprises a beat oscillator circuit which is used for delaying said sampling signal with respect to said radio-frequency transmit signal.

12. The level-measuring device as claimed in claim 9, in which said signal generating device comprises a regulated delay circuit which is used for delaying said sampling signal with respect to said radio-frequency transmit signal.

13. The level-measuring device as claimed in claim 9, in which said radio-frequency transmit signal is a burst signal.

14. The level-measuring device as claimed in claim 1, in which said sampling device comprises at least one diode and one holding capacitor.

15. The level-measuring device as claimed in claim 1, in which said sampling device comprises a mixer circuit.

16. A level-measuring device for determining the level of a medium in a container, comprising: a signal generating device for generating both a radio-frequency transmit signal and a sampling control signal for sampling the radio-frequency signal; a transmitting and/or receiving device; a sampling device, controlled by said sampling control signal, for sampling the radio-frequency signal; and a coupling device for electrically coupling said signal generating device, transmitting and/or receiving device and said sampling device, wherein said coupling device comprises at least one line node.

17. A level-measuring device for determining the level of a medium in a container, comprising: a signal generating device for generating both a radio-frequency transmit signal and a sampling control signal for sampling the radio-frequency signal; a transmitting and/or receiving device; a sampling device, controlled by said sampling control signal, for sampling the radio-frequency signal; and a coupling device for electrically coupling said signal generating device, said transmitting and/or receiving device and said sampling device, wherein said coupling device comprises a $\lambda/4$ coupler.

18. The level-measuring device as claimed in claim 17, in which the $\lambda/4$ coupler is a Wilkinson coupler.

19. The level-measuring device as claimed in claim 17, in which the $\lambda/4$ coupler is a Lange coupler.

20. The level-measuring device as claimed in claim 17, in which the $\lambda/4$ coupler is a directional coupler.

21. The level-measuring device as claimed in claim 17, in which the $\lambda/4$ coupler is a line coupler.

22. The level-measuring device as claimed in claim 17, in which the $\lambda/4$ coupler is a coaxial line coupler.

23. The level-measuring device for determining the level of a medium in a container, comprising: a signal generating device for generating both a radio-frequency transmit signal and a sampling control signal for sampling the radio-frequency signal; a transmitting and/or receiving device; a sampling device, controlled by said sampling control signal, for sampling the radio-frequency signal; and a coupling device for electrically coupling said signal generating device, said transmitting and/or receiving device and said sampling device, wherein said coupling device comprises a circulator.

* * * * *